(12) United States Patent
Parkinson et al.

(10) Patent No.: US 9,377,862 B2
(45) Date of Patent: Jun. 28, 2016

(54) SEARCHLIGHT NAVIGATION USING HEADTRACKER TO REVEAL HIDDEN OR EXTRA DOCUMENT DATA

(71) Applicant: Kopin Corporation, Taunton, MA (US)

(72) Inventors: Christopher Parkinson, Richland, WA (US); Luke Hopkins, Nottinghamshire (GB); David Niland, Nottinghamshire (GB)

(73) Assignee: Kopin Corporation, Westborough, MA (US)

( * ) Notice: Subject to any disclaimer, the term of this patent is extended or adjusted under 35 U.S.C. 154(b) by 177 days.

(21) Appl. No.: 13/799,888

(22) Filed: Mar. 13, 2013

(65) Prior Publication Data

US 2013/0239000 A1 Sep. 12, 2013

Related U.S. Application Data

(63) Continuation-in-part of application No. 13/799,790, filed on Mar. 13, 2013, and a continuation-in-part of application No. 13/234,916, filed on Sep. 16, 2011, now Pat. No. 9,122,307.

(Continued)

(51) Int. Cl.
*G09G 5/37* (2006.01)
*G06F 3/01* (2006.01)
(Continued)

(52) U.S. Cl.
CPC ............... *G06F 3/017* (2013.01); *G06F 3/011* (2013.01); *G06F 3/012* (2013.01); *G06F 3/013* (2013.01); *G06F 3/167* (2013.01); *G06F 2203/04804* (2013.01); *G06F 2203/04806* (2013.01); *G10L 2015/223* (2013.01); *G10L 2015/228* (2013.01)

(58) Field of Classification Search
USPC ....... 715/713, 256; 705/3; 704/720; 709/231; 345/157
See application file for complete search history.

(56) References Cited

U.S. PATENT DOCUMENTS 5,818,455 A * 10/1998 Stone .................... G06T 3/0018
345/619
5,990,793 A 11/1999 Bieback
(Continued)

FOREIGN PATENT DOCUMENTS

CN 1797299 7/2006
CN 101196793 6/2008
(Continued)

OTHER PUBLICATIONS

Notification of Transmittal of the International Search Report and Written Opinion for PCT/US/2013/041349 "Head-Worn Computer With Improved Virtual Display Function" dated Aug. 9, 2013.
(Continued)

*Primary Examiner* — Phi Hoang
(74) *Attorney, Agent, or Firm* — Hamilton, Brook, Smith & Reynolds, P.C.

(57) ABSTRACT

In one embodiment, a method for displaying a user interface on a display of a head worn computer can include displaying a first layer of information in the user interface on a display of the head worn computer. The method can further include receiving a directional input from body movement, eye tracking, or hand gestures. The method can additionally include highlighting an area of the user interface on the display with a second layer of information. The area can be located in the user interface based on the received directional input.

18 Claims, 8 Drawing Sheets

Related U.S. Application Data

(60) Provisional application No. 61/653,127, filed on May 30, 2012, provisional application No. 61/749,240, filed on Jan. 4, 2013, provisional application No. 61/384,586, filed on Sep. 20, 2010.

(51) Int. Cl.
*G06F 3/16* (2006.01)
*G10L 15/22* (2006.01)

(56) References Cited

U.S. PATENT DOCUMENTS

| | | |
|---|---|---|
| 6,010,216 A | 1/2000 | Jesiek |
| 6,108,197 A | 8/2000 | Janik |
| 6,204,974 B1 | 3/2001 | Spitzer |
| 6,325,507 B1 | 12/2001 | Jannard |
| 6,538,676 B1 | 3/2003 | Peters |
| 6,798,391 B2 | 9/2004 | Peterson, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,966,647 B2 | 11/2005 | Jannard et al. |
| 7,004,582 B2 | 2/2006 | Jannard et al. |
| 7,013,009 B2 | 3/2006 | Warren |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,249,846 B2 | 7/2007 | Grand et al. |
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,512,414 B2 | 3/2009 | Jannard et al. |
| 7,620,432 B2 | 11/2009 | Willins et al. |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,959,084 B2 | 6/2011 | Wulff |
| 7,966,189 B2 | 6/2011 | Le et al. |
| 7,967,433 B2 | 6/2011 | Jannard et al. |
| 7,976,480 B2 | 7/2011 | Grajales et al. |
| 7,988,283 B2 | 8/2011 | Jannard |
| 7,997,723 B2 | 8/2011 | Pienimaa et al. |
| 8,010,156 B2 | 8/2011 | Warren |
| 8,020,989 B2 | 9/2011 | Jannard et al. |
| 8,025,398 B2 | 9/2011 | Jannard |
| 8,072,393 B2 | 12/2011 | Riechel |
| 8,092,011 B2 | 1/2012 | Sugihara et al. |
| 8,098,439 B2 | 1/2012 | Amitai et al. |
| 8,123,352 B2 | 2/2012 | Matsumoto et al. |
| 8,140,197 B2 | 3/2012 | Lapidot et al. |
| 8,212,859 B2 | 7/2012 | Tang et al. |
| 2002/0015008 A1 | 2/2002 | Kishida et al. |
| 2002/0094845 A1 | 7/2002 | Inasaka |
| 2003/0016253 A1* | 1/2003 | Aoki et al. ............ 345/863 |
| 2003/0065805 A1* | 4/2003 | Barnes, Jr. ............ 709/231 |
| 2003/0068057 A1 | 4/2003 | Miller et al. |
| 2005/0047629 A1 | 3/2005 | Farrell et al. |
| 2005/0108643 A1* | 5/2005 | Schybergson et al. ........ 715/713 |
| 2005/0114140 A1* | 5/2005 | Brackett et al. ............ 704/270 |
| 2005/0264527 A1 | 12/2005 | Lin |
| 2006/0010368 A1* | 1/2006 | Kashi ............ 715/512 |
| 2006/0132382 A1 | 6/2006 | Jannard |
| 2008/0052643 A1 | 2/2008 | Ike et al. |
| 2008/0120141 A1* | 5/2008 | Kariathungal et al. ........... 705/3 |
| 2008/0198324 A1 | 8/2008 | Fuziak |
| 2008/0201634 A1* | 8/2008 | Gibb et al. .................. 715/256 |
| 2008/0211768 A1* | 9/2008 | Breen et al. .................. 345/157 |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2009/0182562 A1 | 7/2009 | Caire et al. |
| 2010/0020229 A1 | 1/2010 | Hershey et al. |
| 2010/0033830 A1 | 2/2010 | Yung |
| 2010/0053069 A1 | 3/2010 | Tricoukes et al. |
| 2010/0119052 A1* | 5/2010 | Kambli .................. 379/265.02 |
| 2010/0121480 A1 | 5/2010 | Stelzer et al. |
| 2010/0171680 A1 | 7/2010 | Lapidot et al. |
| 2010/0238184 A1 | 9/2010 | Janicki |
| 2010/0271587 A1 | 10/2010 | Pavlopoulos |
| 2010/0277563 A1 | 11/2010 | Gupta et al. |
| 2010/0289817 A1 | 11/2010 | Meier et al. |
| 2010/0302137 A1 | 12/2010 | Benko et al. |
| 2011/0001699 A1 | 1/2011 | Jacobsen et al. |
| 2011/0089207 A1 | 4/2011 | Tricoukes et al. |
| 2011/0090135 A1 | 4/2011 | Tricoukes et al. |
| 2011/0161872 A1* | 6/2011 | Abramson ............ G01C 21/367 715/800 |
| 2011/0214082 A1 | 9/2011 | Osterhout et al. |
| 2011/0219291 A1* | 9/2011 | Lisa .................. G06F 17/30651 715/207 |
| 2011/0221656 A1 | 9/2011 | Haddick et al. |
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0254698 A1 | 10/2011 | Eberl et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0056846 A1 | 3/2012 | Zaliva |
| 2012/0062445 A1 | 3/2012 | Haddick et al. |
| 2012/0105740 A1 | 5/2012 | Jannard et al. |
| 2012/0110456 A1 | 5/2012 | Larco et al. |
| 2012/0114131 A1 | 5/2012 | Tricoukes et al. |
| 2012/0188245 A1 | 7/2012 | Hyatt |

FOREIGN PATENT DOCUMENTS

| | | |
|---|---|---|
| CN | 101349944 | 1/2009 |
| CN | 101620511 | 1/2010 |
| JP | 2001-100878 A | 4/2001 |
| JP | 2001-506389 A | 5/2001 |
| JP | 2001-216069 A | 8/2001 |
| JP | 2002-525769 A | 8/2002 |
| JP | 2008-052590 A | 3/2008 |
| JP | 2009-179062 A | 8/2009 |
| WO | WO 95/21408 | 8/1995 |
| WO | WO 95/23994 | 9/1995 |
| WO | WO 99/01838 | 1/1999 |
| WO | WO 00/17848 | 3/2000 |
| WO | WO 00/79327 | 12/2000 |
| WO | WO 2009/076016 | 6/2009 |
| WO | WO 2009/120984 | 10/2009 |
| WO | WO 2011/051660 | 5/2011 |
| WO | WO 2011/097226 A1 | 8/2011 |
| WO | WO 2012/040386 | 3/2012 |
| WO | WO 2013/180966 | 12/2013 |

OTHER PUBLICATIONS

International Preliminary Report on Patentability dated Dec. 2, 2014, entitled: Head-Worn Computer With Improved Virtual Display Function, for Int'l Application No. PCT/US2013/041349.

* cited by examiner

SEARCHLIGHT NAVIGATION USING HEADTRACKER TO REVEAL HIDDEN OR EXTRA DOCUMENT DATA

RELATED APPLICATION

This application claims the benefit of U.S. Provisional Application No. 61/653,127, filed on May 30, 2012. The entire teachings of the above application is incorporated herein by reference. This application also claims priority to and is a continuation-in-part of U.S. application Ser. No. 13/799,790, filed Mar. 13, 2013 which claims the benefit of U.S. Application No. 61/749,240 filed Jan. 4, 2013 and is a continuation-in-part of U.S. application Ser. No. 13/234,916 filed Sep. 16, 2011, which claims the benefit of U.S. Application No. 61/384,586 filed Sep. 20, 2010.

BACKGROUND OF THE INVENTION

Mobile computing devices, such as notebook PCs, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers seek a hands-free high-quality, portable, color display solution to augment or replace their hands-dependent mobile devices.

SUMMARY OF THE INVENTION

In one embodiment, a method for displaying a user interface on a display of a head worn computer can include displaying a first layer of information in the user interface on a display of the head worn computer. The method can further include receiving a directional input from body movement, eye tracking, or hand gestures. The method can additionally include highlighting an area of the user interface on the display with a second layer of information. The area can be located in the user interface based on the received directional input.

In another embodiment, the method can include aligning the second layer of information with the first layer of information. The method can also include moving the highlighted area of the user interface in a same direction and proportionally to the received directional input.

In another embodiment, the second layer of information can display voice commands to activate areas of the first layer of information. The method can further include receiving a voice command displayed in the second layer of information. The method can also include activating a feature of the first layer of information corresponding to the voice command.

In another embodiment, the method can also include highlighting the area of the user interface on the display with a third layer of information based on a selection user input. The selection user input can be configured to cycle the highlighted area of the user interface on the display with the first, second, and third layer of information. The received directional input can be from head motion. The area can move in the same direction as the head motion.

The first layer of information can include a representation of a webpage. The second layer of information can include representations of voice commands to activate links within the webpage.

The method can also include reorganizing the representations of voice commands such that the representations are non-overlapping and readable.

In another embodiment, a head worn computer for displaying a user interface can include a reception module configured to receive a directional input from at least one of body movement, eye tracking, or hand gestures. The head worn computer can further include a display module configured to display a first layer of information in the user interface on a display of the head worn computer and further configured to highlight an area of the user interface on the display with a second layer of information. The area can be located in the user interface based on the received directional input.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a user interface diagram illustrating an example embodiment of a highlighted webpage layer.

DETAILED DESCRIPTION OF THE INVENTION

A description of example embodiments of the invention follows.

Figure 1:
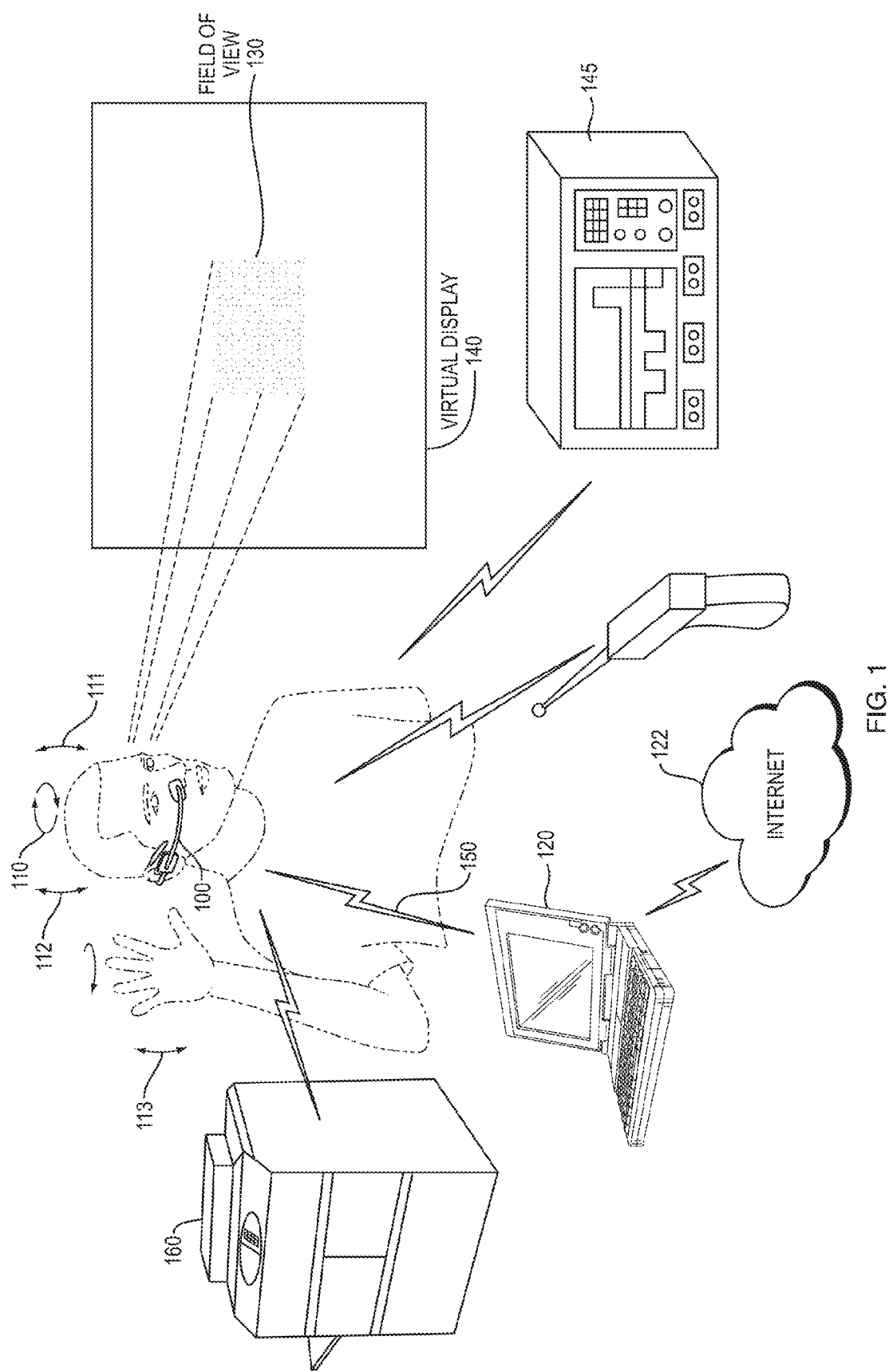
FIG. 1 depicts a wireless hands-free video computing headset (or head mounted display (HMD), or headset computer (HSC)).

FIG. 1 depicts a wireless hands-free video computing headset (or head mounted display (HMD), or headset computer (HSC)) containing one or more microdisplays, local processors, wireless transceivers for the communications of data, which may include audio/voice, and/or graphical/video data, which may, or may not, be further integrated with one or multiple peripheral devices, examples of such integrated peripheral devices include, but are not limited to, microphones, speakers, 3 axis to 9 axis degrees of freedom orientational sensing, geo-positional sensors, atmospheric sensors, health condition sensors, GPS, digital compass (multi-axis magnetometer), flash light, altimeter, pressure sensors, various environmental sensors, personal sensors, energy sensors, optical sensors and/or cameras.

The wireless hands-free video computing headset can include a microdisplay device to present information to the user graphically, and can use an input device such as head tracking accelerometers, gyros, or a camera or cameras to detect movements, such as head movements, hand motions and/or gestures, along with optional voice commands, to provide remote control of applications running on either a local processor or a remote host processor in various ways.

The example embodiment depicted in FIG. 1 shows a wireless computing headset device 100 (also referred to herein as a video eyewear device 100 of HSC 100) that incorporates a resolution (WQVGA or better) microdisplay element 1010 and other features described below. Audio input and/or output devices, including one or more microphone(s), input and output speaker(s), geo-positional sensing, 3 axis to 9 axis degrees of freedom orientational sensing, atmospheric sensors, health condition sensors, GPS, digital compass, pressure sensors, environmental sensors, energy sensors, acceleration, position, altitude, motion, velocity or optical sensors, cameras (visible light, infrared (IR), ultra violet (UV), etc.), additional wireless radios (Bluetooth®, Wi-Fi®, LTE 4G Cellular, FM, etc.), auxiliary lighting, range finders, or the like, and/or an array of sensors embedded in the headset and/or attached to the device via one or more peripheral ports (not shown in detail in FIG. 1). (Bluetooth is a registered trademark of Bluetooth Sig, Inc., of Kirkland Wash.; Wi-Fi is a registered trademark of Wi-Fi Alliance Corporation of Austin Tex.) Also typically located within the housing are various electronic circuits including, as will be understood shortly, a microcomputer (single or multi-core), one or more wired or wireless interfaces, and/or optical interfaces, associated memory and/or storage devices, various sensors, and a peripheral mount or mounts such as a "hot shoe".

The device 100 can be used in various ways. It can be used as a remote display for a streaming video signal provided by a remote host computing device 200. The host 200 may be, for example, a laptop, cell phone, Blackberry, iPhone™, or other computing device having less or greater computational complexity than the wireless computing headset remote control device 100. The host 200 may be further connected to other networks such as through a wired or wireless connection 210 to the Internet. The device 100 and host 200 are connected via one or more suitable wireless connections such as provided by a Bluetooth WiFi, cellular, LTE, WiMax or other wireless radio link 150.

The device 100 can also be used as a remote control for the host 120. For example, the device 100 can allow a user to select a field of view 130 within a much larger area defined by a virtual display 140 on host 120. The user can typically control the position, extent (e.g., X-Y or 3D range), and/or magnification of the field of view 300 using head movements or hand movements or body gestures or in other ways, such as with vocal commands as detected by the HSC 100. The wireless computing headset device 100 thus can have specialized user input peripherals and processing to, for example, pan and zoom and control the field of view of the display.

Also located within device 100 are circuits including, as will be understood shortly, a microcomputer (single or multi-core), one or more wireless interfaces, associated memory or other storage devices, one or more cameras (optical sensors) and/or various sensors previously mentioned. The camera(s), motion sensor(s) and/or positional sensor(s) are used to track the motion and/or position of the user's head, hands and/or body in at least a first axis 111 (horizontal), but preferably also a second (vertical) 112, a third (depth) 113, a fourth (pitch) 114, a fifth (roll) 115 and a sixth (yaw) 116. A three axis magnetometer (digital compass) can be added to provide the wireless computing headset or peripheral device with a full 9 axis degrees of freedom positional accuracy.

The device 100 also includes at least one microphone and corresponding electronics and/or programmable processors for speech recognition. The device 100 detects a user's voice, and using speech recognition, derives commands and/or dictations. The device 100 uses the commands derived from the speech recognition to perform functions indicated by the commands.

As mentioned, the device 100 is used as a remote control for a host computing device 120. The host 120 may be, for example, a laptop, cell phone, Blackberry™, iPhone™, or other computing device having less or greater computational complexity than the remote control device 100. The host 120 may be further connected to other networks such as through a wireless connection 122 to the Internet. The remote control 100 and host 120 are connected via a suitable wireless connection such as provided by a Bluetooth™, WiFi or other short range wireless link 150.

According to aspects that will be explained in more detail below, the remote control device 100 allows a user to select a field of view 130 within a much larger area defined by a virtual display. The user can typically control the position, extent (e.g., X-Y or 3D range), and/or magnification of the field of view 130.

The HSC 100 communicates 150 with one or more host processors. The host processors may be integrated into such devices as a typical personal computer (PC) 200, meteorological, diagnostic, or other test equipment 145, including wireless test probes, and/or any other computing device including, but not limited to, printers 160, thermostats, or onboard computer systems of a vehicle. The wireless hands-free video computing headset 100 transmits commands 150 to a host and receives replies based on those commands.

The replies 150 received by the HSC 100 may include status messages from the host processor, indicating the state of that computing device, data resulting from self-diagnosis processes, or other information.

In an alternative embodiment, HSC commands 150 and received replies 150 may include messaging to facilitate and execute diagnostic procedures utilizing one or more expert decision trees.

In a yet further alternative embodiment, HSC 100 communications 150 with the host processor may include transmitting and receiving audio, graphical, and/or video data to/from a live expert in real time.

In a yet further alternative embodiment, HSC 100 communications 150 with the host processor may include video of a three-dimensional representation of the user's body, which may include representations of physical and non-physical objects in the user's proximate environment, and/or an overlay of an expert body to provide expert guidance to the user.

In one embodiment, the HSC 100 enables "Searchlight Navigation" of a hyper-linked page. User-interface screens, application, and complex hyperlinked pages, such as web pages, can be navigated by speech, voice or gesture. The HSC 100 highlights hyperlinks on the page, and enumerates each one with a corresponding voice command. The enumerated voice commands allow the user to speak the link number, name, or codeword so the HSC 100 navigates to the selected hyperlink. This approach works well when the web page is simple in nature, for example, one with less than 30 links per page to enumerate. However, a web page can be more complex, offering the user hundreds of links per page. Further, a web page can provide small and tightly packed links that are difficult to highlight and label individually.

In one embodiment, the system simplifies navigation of complex web pages in an HSC by enabling a search-light (e.g., spotlight, torchlight, highlighted area, etc.) in the user-interface that presents additional relevant information to the user, focusing on just a part of the screen and/or web page. The search-light causes a typical web page to appear with a circle, rectangle or other shape, that highlights the area of the screen of which the user is focused. This search-light can be moved around the web page using the head-tracker (or eye-tracker, hand gestures, or any combination of the three). Natural head movements can move the search-light leftward, rightward, upward and downward or on a diagonal of any slope. Gestures can further increase or decrease the size of the search-light.

Outside of the search-light, the web page appears normal with no overlaid links. However, inside the search-light, links are highlighted and enumerated. The search-light of the HSC 100 can further 'explode' closely packed links and list the links' corresponding labels around the outside of the shape.

In another embodiment, Searchlight Navigation provides "X-Ray vision" of a multi-layered document. The 100 can then apply the same approach to many visual data types in addition to speech links, giving "X-ray," or see-through, visibility to a dataset or layer under the top, or initially visible, layer. For example, in a multi-layer diagram, such as a schematic layout of a multi-layer electronic board, the top layer can be shown, and the search-light can be used to trace underlying layers. Further, in one embodiment, a hand gesture can cycle between multiple underlying layers.

Similarly, the HSC 100 can display a road map at the top level, with a satellite overlay shown in the search-light. The searchlight is directed under head-movement control. Gestures can cycle through multiple maps, for example, a map showing terrain, a map showing traffic, and a map showing satellite.

Figure 2:
FIG. 2 is a user interface diagram illustrating an example embodiment of a webpage layer displayed by a headset computer to a user.

FIG. 2 is a user interface diagram 200 illustrating an example embodiment of a webpage layer 202 displayed by an HSC 100 to a user. The webpage layer 202 shows a news webpage, as shown normally to the user. The webpage includes a plurality of hyperlinks that the user can select to view another webpage. However, when the user is navigating with voice commands, the user may need a prompt to be able to select the correct hyperlink.

FIG. 3 is a user interface diagram 300 illustrating an example embodiment of a highlighted webpage layer 302. The highlighted webpage layer 302 includes highlighted links 304*a-r*. Each highlighted link 304*a-r* shows a respective command, or voice tag, to open the link (e.g., link 1-19). The highlighted links 304*a-r* can be semi-transparent, in some embodiments, to allow the user to see the text of the underlying hyperlink. Further, the highlighted link layer 302 can be configured to block advertisements from being paired with a voice tag, to further simplify the options presented to the user.

Figure 4A:
FIG. 4A is a user interface diagram illustrating an example embodiment of a spotlight (or torchlight) showing the highlighted webpage layer in a local area and the webpage layer in the remaining user interface.

FIG. 4 is a user interface diagram 400 illustrating an example embodiment of a spotlight 402 (or torchlight) showing the highlighted webpage layer 302 in a local area and the webpage layer 202 in the remaining user interface. Within the spotlight are highlighted links 304*c-j*, 304 *m* and 304 *p*. The spotlight is a shape, such as a circle, that shows another layer of information related to the first layer. In this example, the spotlight unveils the highlighted webpage layer 302 over the webpage layer 202. The user can then read the voice commands shown to activate the given hyperlink. Further, the user can move the spotlight around the user interface to show other highlighted links by moving his or her head. The HSC 100 can determine the head motion from head tracking technology and move the spotlight in a corresponding manner.

In another embodiment, the user can say a voice command such as "Show Commands" to present the entire highlighted link layer 302 to the user. The user can also say a voice command such as "show spotlight" to go into spotlight mode.

Figure 4B:
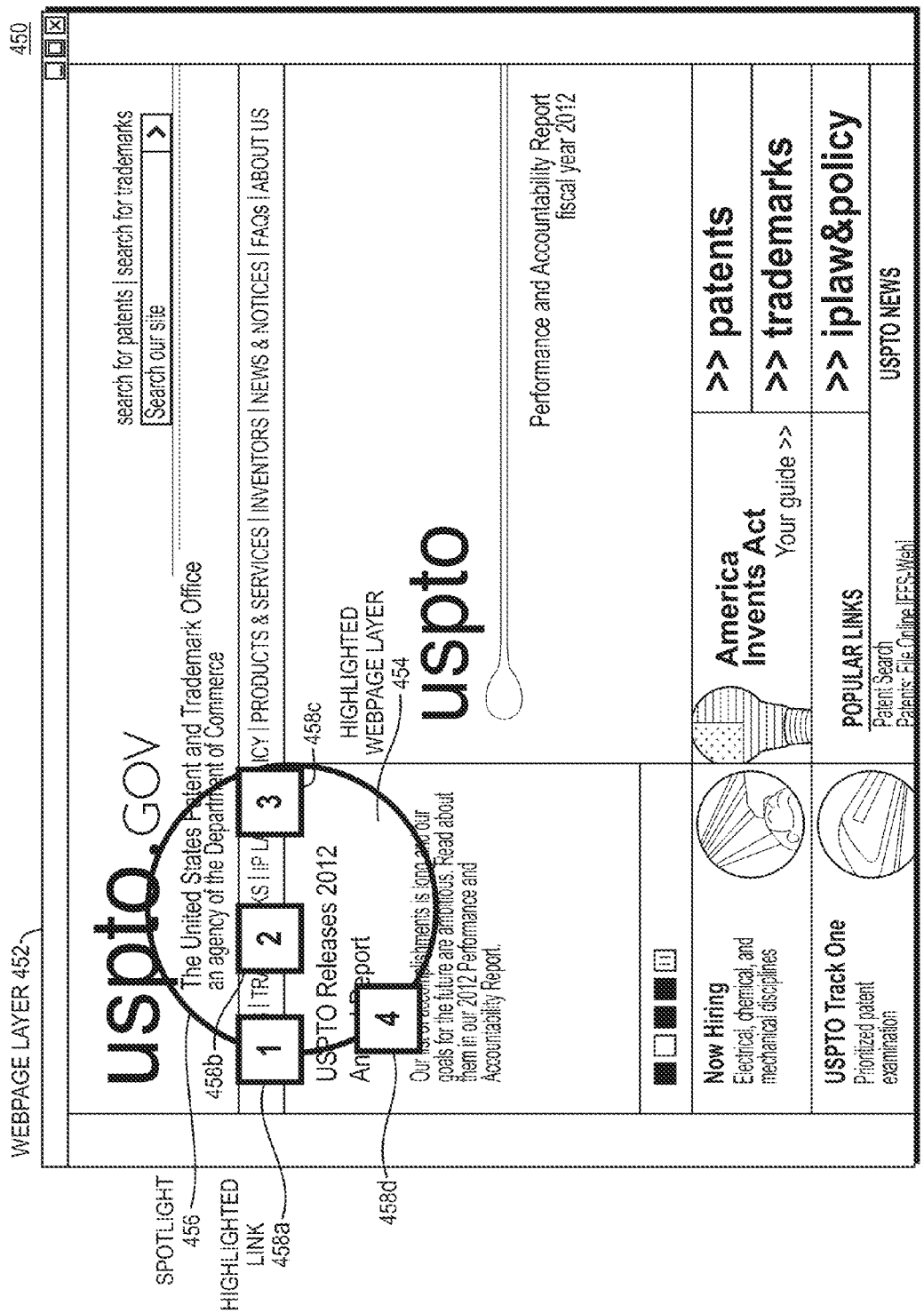
FIG. 4B is a user interface diagram illustrating an example embodiment of a spotlight (or torchlight) showing a highlighted webpage layer in a local area and a webpage layer in the remaining user interface.

FIG. 4B is a user interface diagram 450 illustrating an example embodiment of a spotlight 456 (or torchlight) showing a highlighted webpage layer 454 in a local area and a webpage layer 452 in the remaining user interface. The spotlight 456 is similar to the spotlight described in relation to FIG. 4A, however, the spotlight 456 in FIG. 4B shows a highlighted webpage layer 545 with highlighted links 458*a-d* showing a minimal amount of text. That is, they show a number associated with the link (e.g., 1-, respectively). In this embodiment, the highlighted links 458*a-d* are more compact and could highlight more links in a small area, for example.

Figure 5:
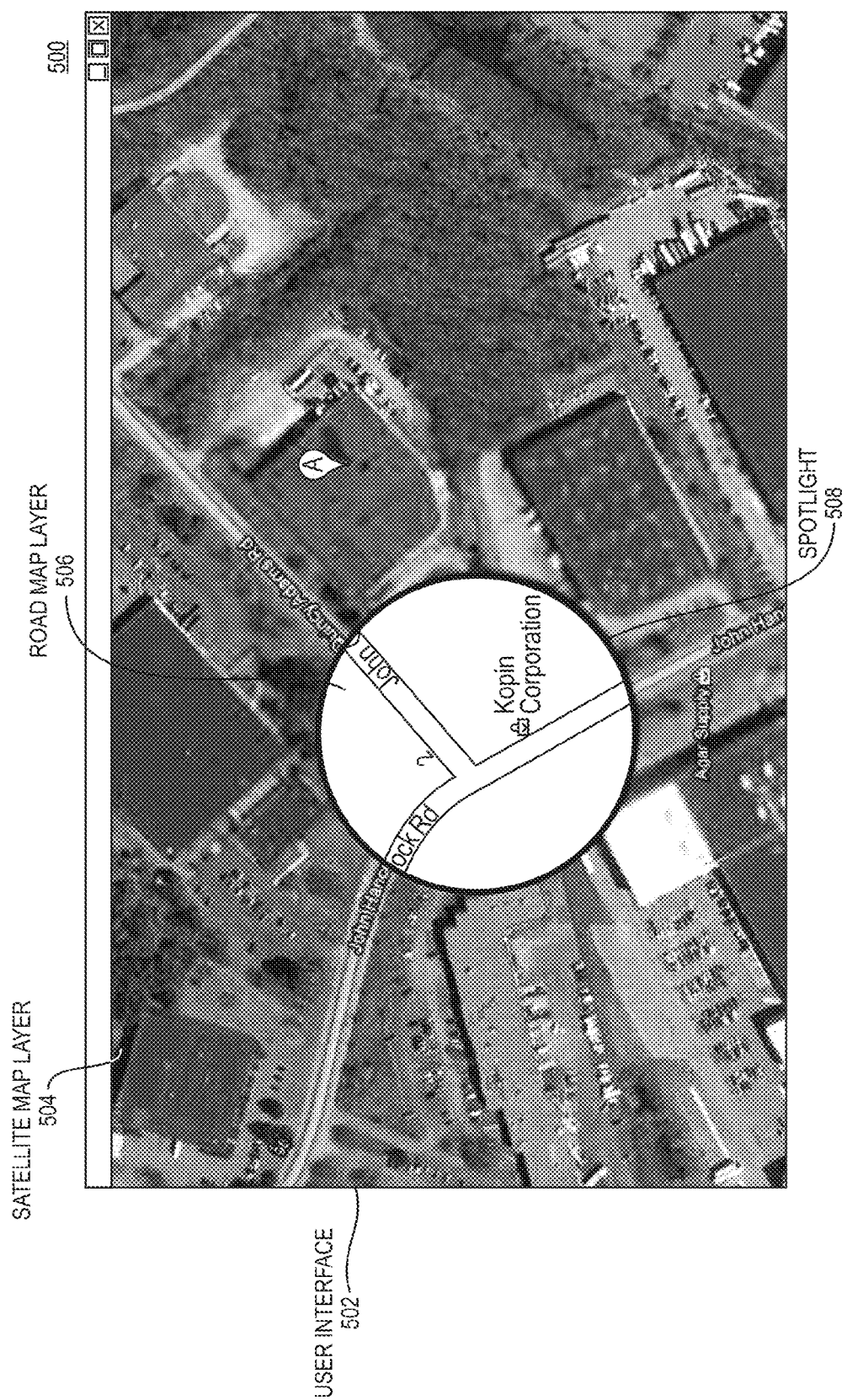
FIG. 5 is a user interface diagram illustrating an example embodiment of a spotlight employed in a map application.

FIG. 5 is a user interface diagram 500 illustrating an example embodiment of a spotlight 508 employed in a map application. The user interface 502 shows a satellite map layer 504 and the spotlight 508. Within the spotlight is a road map layer 506. The user can move the spotlight 508 across the user interface, showing other areas of the road map layer 506, by employing head tracking technology, as described above.

The spotlight can also cycle through multiple layers. For example, the user can issue a voice command such as "next layer" or "previous layer" or a gesture command to show another layer. For example, in the map application, another layer could be a terrain layer or a traffic layer.

Figure 6:
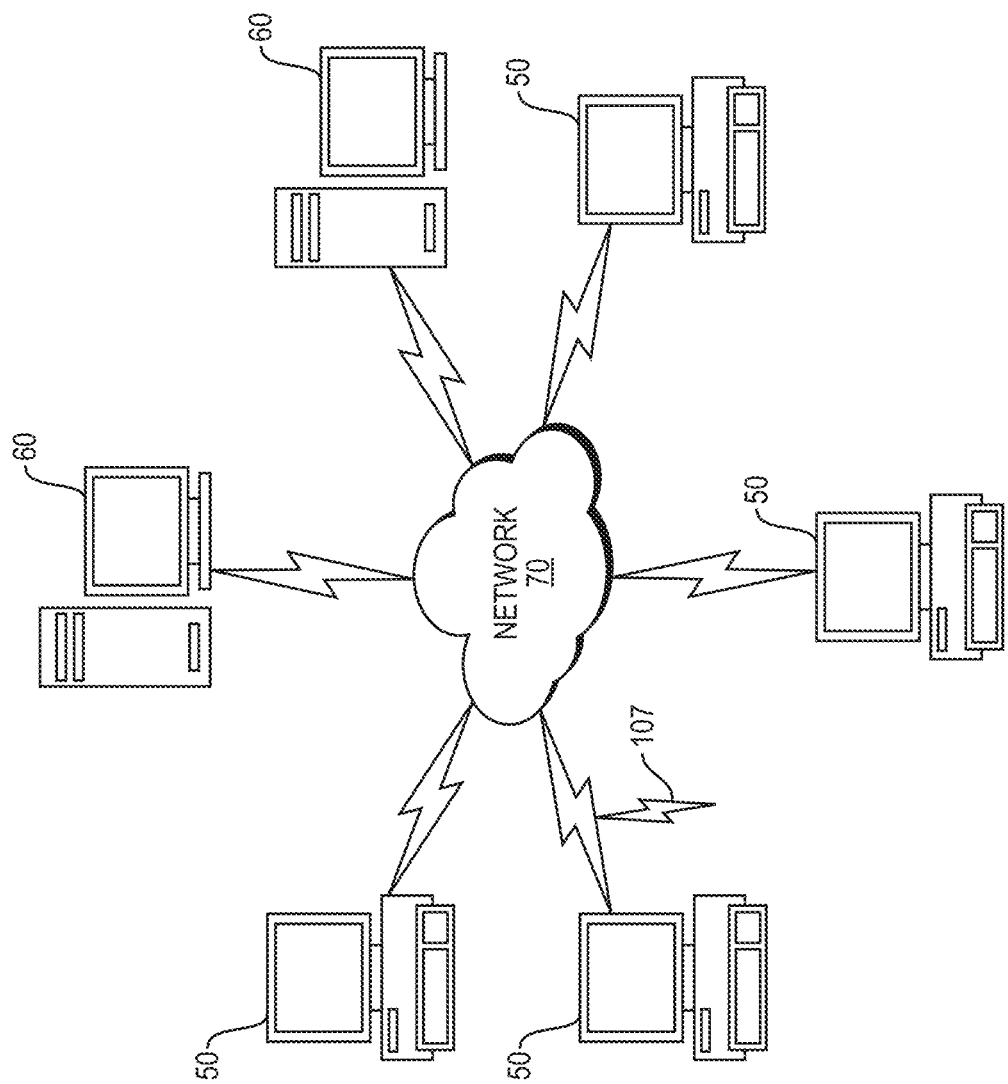
FIG. 6 illustrates a computer network or similar digital processing environment in which the present invention may be implemented.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
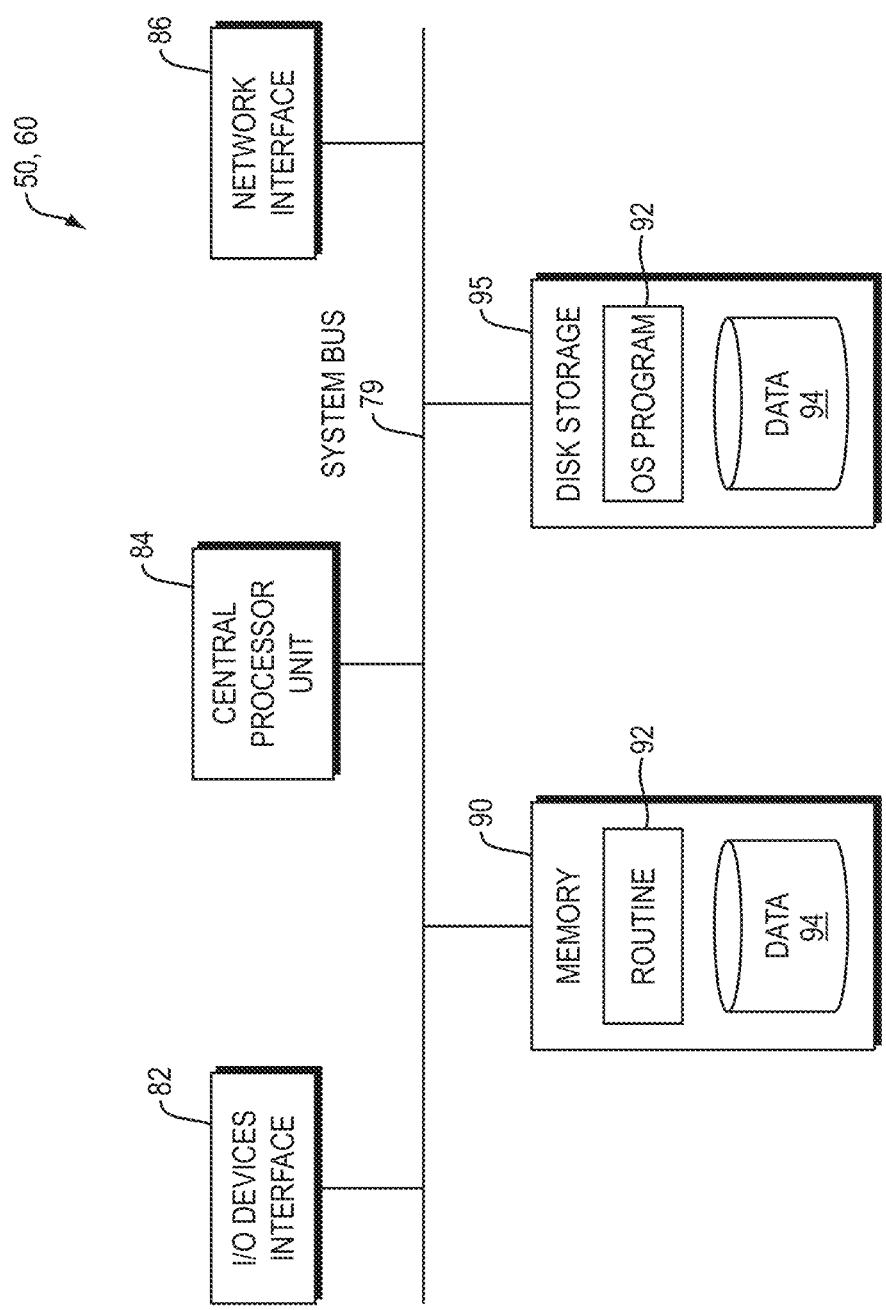
FIG. 7 is a diagram of the internal structure of a computer (e.g., client processor/device or server computers) in the computer system of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., spotlight module code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for displaying a user interface on a display of a head worn computer, the method comprising:
    displaying a first layer of information identifying individual hyperlinks in the user interface on the display of the head worn computer;
    receiving a directional input from at least one of body movement, eye tracking, or hand gestures; and
    enabling a spotlight area of the user interface, the spotlight area encompassing a portion of the user interface that is smaller than the entire user interface and having a boundary that is independent of content within the user interface, the spotlight area (i) highlighting one or more of the individual hyperlinks on the display with a second layer of information, (ii) exploding the hyperlinks apart from one another within the spotlight area and (iii) listing one or more labels corresponding to the hyperlinks around the outside of the spotlight area, the spotlight area being located in the user interface based on the received directional input.

2. The method of claim 1, further comprising aligning the second layer of information with the first layer of information.

3. The method of claim 1, further comprising moving the highlighted area of the user interface in a same direction and proportionally to the received directional input.

4. The method of claim 1, wherein the second layer of information displays voice commands to activate areas of the first layer of information.

5. The method of claim 4, further comprising:
    receiving a voice command displayed in the second layer of information; and
    activating a feature of the first layer of information corresponding to the voice command.

6. The method of claim 1, further comprising:
    highlighting the area of the user interface on the display with a third layer of information based on a selection user input, wherein the selection user input is configured to cycle the highlighted area of the user interface on the display with the first, second, and third layer of information.

7. The method of claim 1, wherein the first layer of information includes a representation of a webpage, and the second layer of information includes representations of voice commands to activate links within the webpage.

8. The method of claim 7, further comprising reorganizing the representations of voice commands such that the representations are non-overlapping and readable.

9. The method of claim 1, wherein the received directional input is from head motion, and the area moves in the same direction as the head motion.

10. A head worn computer for displaying a user interface, the system comprising:
    at least one sensor configured and arranged to receive one of an optical, an orientational, an acceleration, a position, a motion, a velocity, or a directional input from at least one of body movement, eye tracking, or hand gestures; and
    a microdisplay element configured and arranged to display a first layer of information identifying individual hyperlinks in the user interface on a display of the head worn computer and further configured to enable a spotlight area of the user interface, the spotlight area encompassing a portion of the user interface that is smaller than the entire user interface and having a boundary that is independent of content within the user interface, the spotlight area (i) highlighting one or more of the individual hyperlinks on the display with a second layer of information, (ii) exploding the hyperlinks apart from one another within the spotlight area and (iii) listing one or more labels corresponding to the hyperlinks around the outside of the spotlight area, the spotlight area being located in the user interface based on the received directional input.

11. The system of claim 10, wherein the display module is further configured to align the second layer of information with the first layer of information.

12. The system of claim 10, wherein the display module is further configured to move the highlighted area of the user interface in a same direction and proportionally to the received directional input.

13. The system of claim 10, wherein the second layer of information displays voice commands to activate areas of the first layer of information.

14. The system of claim 13, wherein the reception module is further configured to receive a voice command displayed in the second layer of information, and wherein the display module is further configured to activate a feature of the first layer of information corresponding to the voice command.

15. The system of claim 10, wherein the display module is further configured to highlight the area of the user interface on the display with a third layer of information based on a selection user input, wherein the selection user input is configured to cycle the highlighted area of the user interface on the display with the first, second, and third layer of information.

16. The system of claim 10, wherein the first layer of information includes a representation of a webpage, and the second layer of information includes representations of voice commands to activate links within the webpage.

17. The system of claim 16, wherein the display module is further configured to reorganize the representations of voice commands such that the representations are non-overlapping and readable.

18. The system of claim 10, wherein the received directional input is from head motion, and the area moves in the same direction as the head motion.

* * * * *